US008544727B1

(12) United States Patent
Quinn et al.

(10) Patent No.: US 8,544,727 B1
(45) Date of Patent: Oct. 1, 2013

(54) METHOD AND SYSTEM FOR ANTI-MONEY LAUNDERING SURVEILLANCE

(75) Inventors: Matthew R. Quinn, Wilmington, MA (US); Agus Sudjianto, Matthews, NC (US); Peter C. Richards, Pembroke, MA (US); Misty Ritchie, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1651 days.

(21) Appl. No.: 11/554,191

(22) Filed: Oct. 30, 2006

(51) Int. Cl.
*G06Q 40/00* (2012.01)
(52) U.S. Cl.
USPC .............. 235/379; 235/380; 705/2; 705/35; 705/38

(58) Field of Classification Search
USPC ....................... 235/379; 705/35, 38
See application file for complete search history.

(56) References Cited

U.S. PATENT DOCUMENTS

| 7,505,931 | B2* | 3/2009 | Da Silva ....................... 705/35 |
| 2003/0033228 | A1* | 2/2003 | Bosworth-Davies et al. .. 705/35 |
| 2003/0177087 | A1* | 9/2003 | Lawrence ..................... 705/38 |
| 2004/0117316 | A1* | 6/2004 | Gillum .......................... 705/64 |
| 2010/0004891 | A1* | 1/2010 | Ahlers et al. .................. 705/11 |

* cited by examiner

*Primary Examiner* — Christopher Stanford
(74) *Attorney, Agent, or Firm* — Michael A. Springs; Moore & Van Allen PLLC; Padowithz Alce

(57) ABSTRACT

A method for anti-money laundering surveillance may include analyzing transaction data based on a group that may include at least one of peer comparison, expected level of activity and debit/credit flow through. The method may also include generating an alert in response to one or more predetermined results from the analyzing.

17 Claims, 10 Drawing Sheets

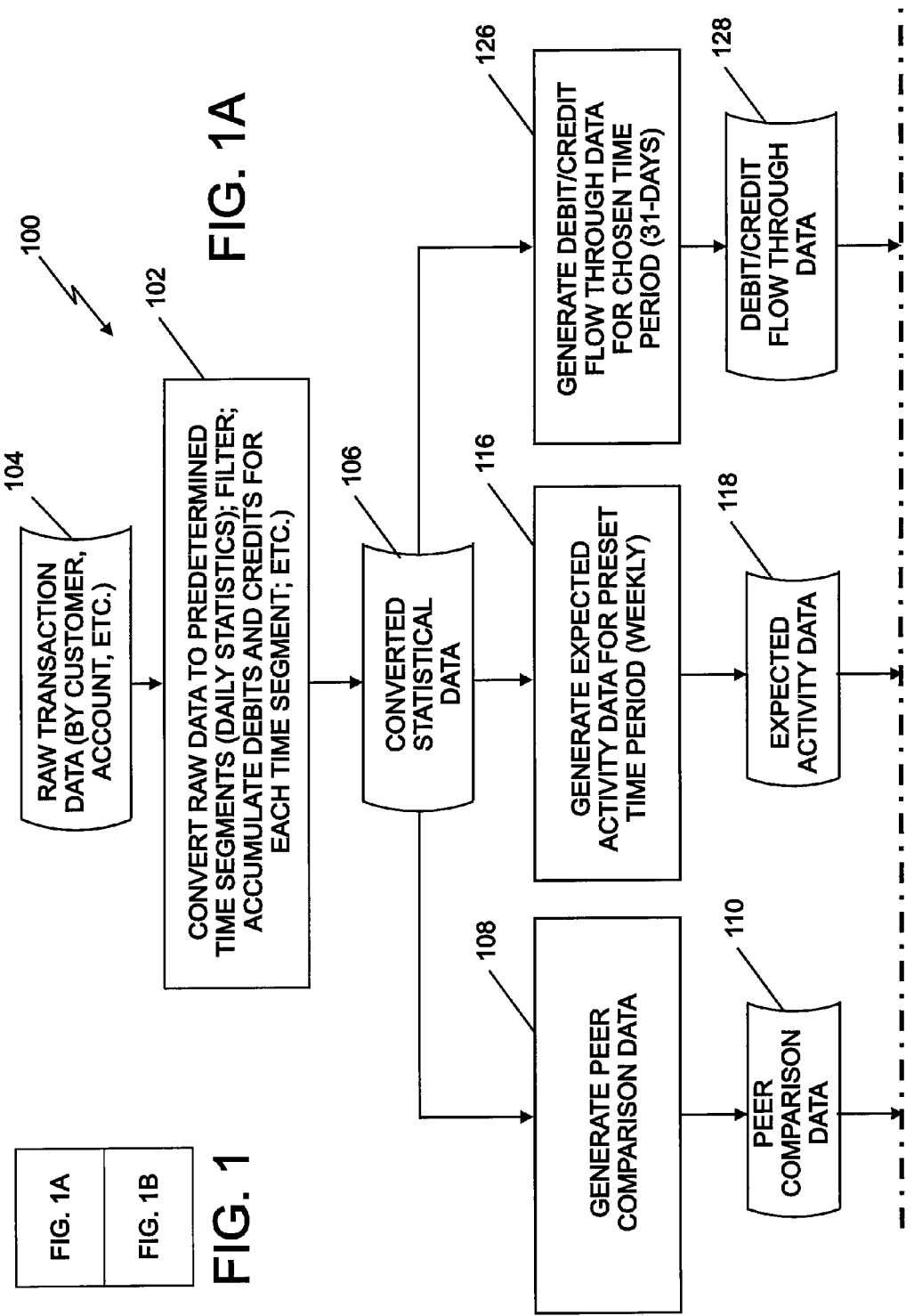

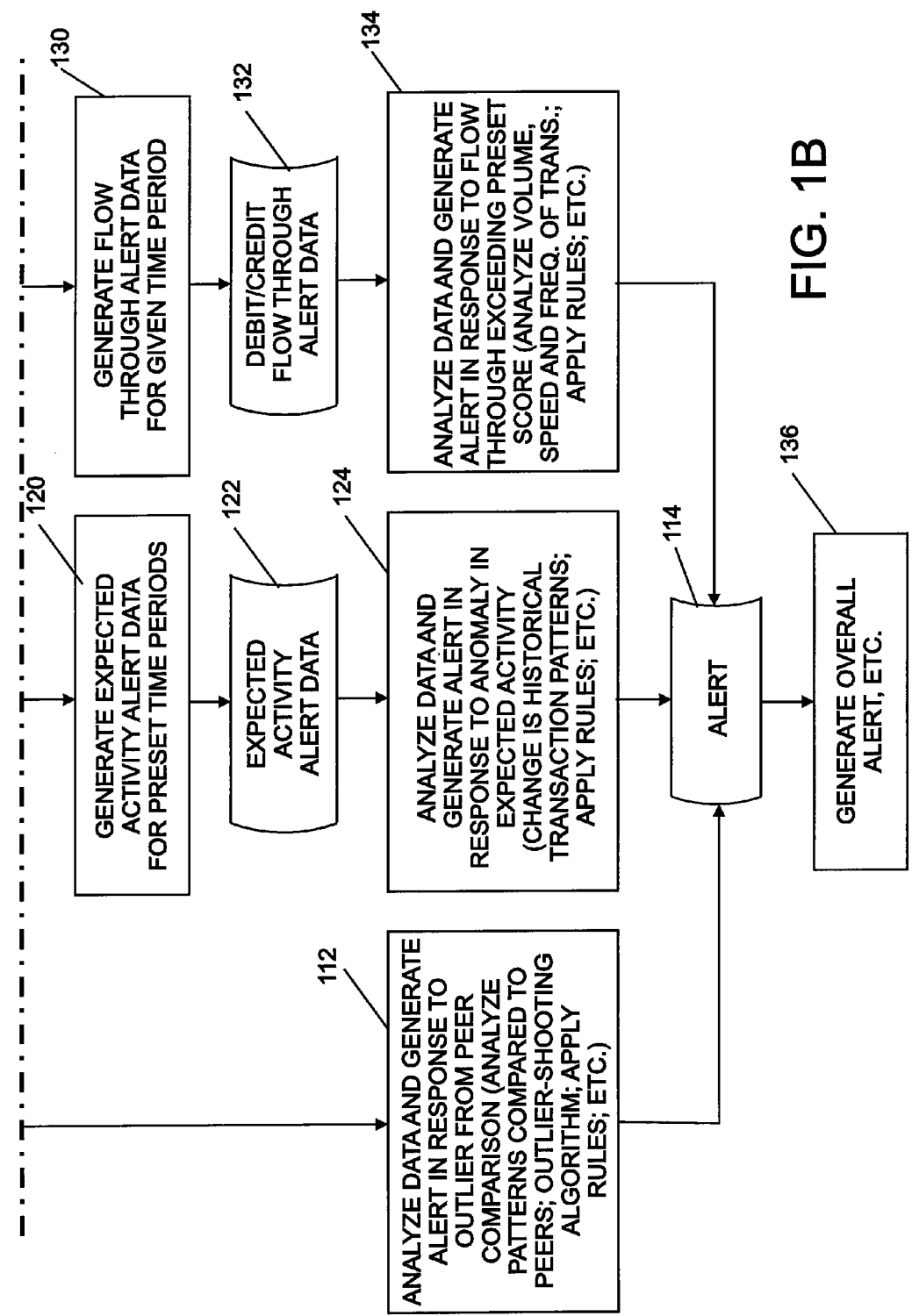

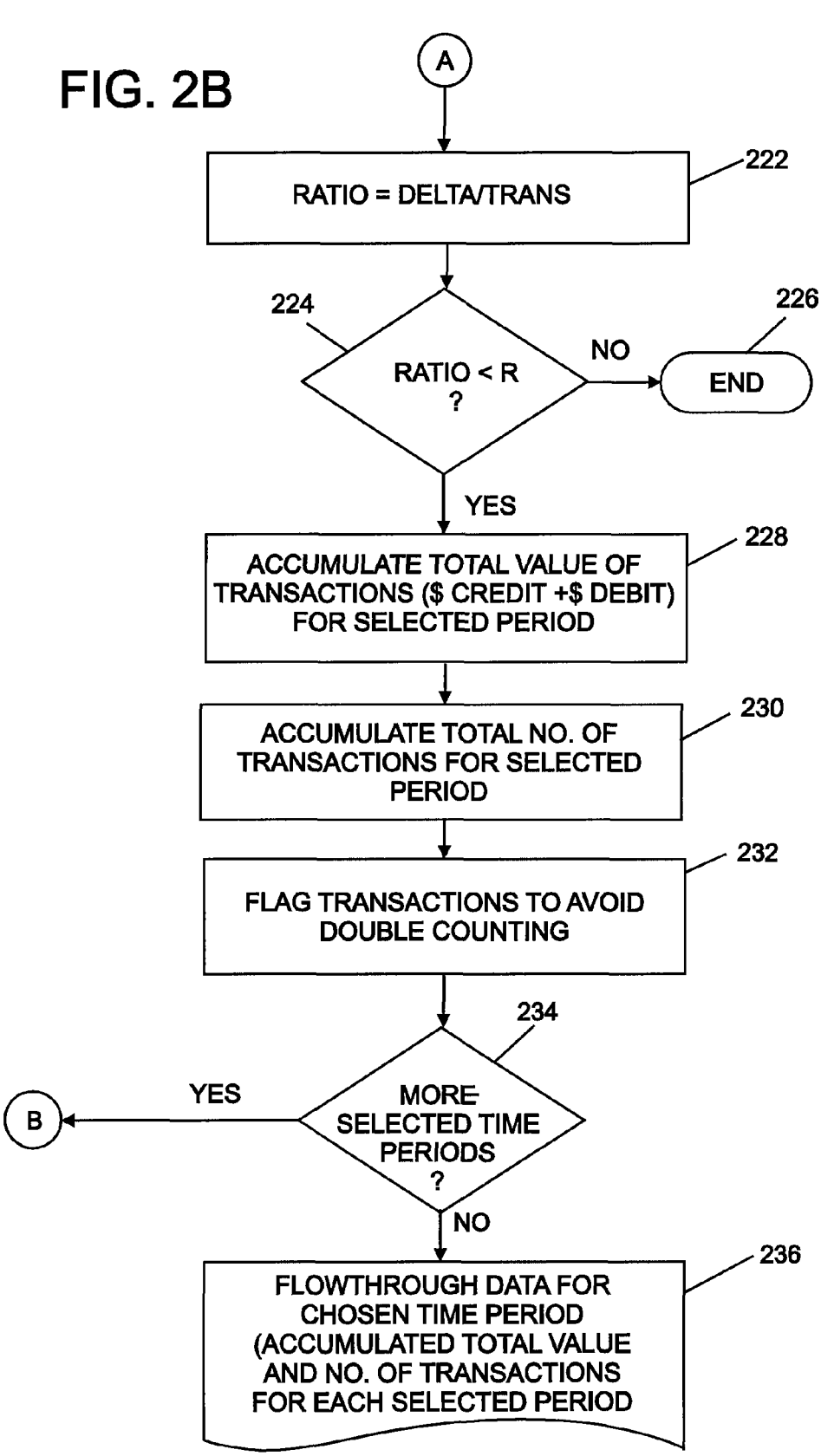

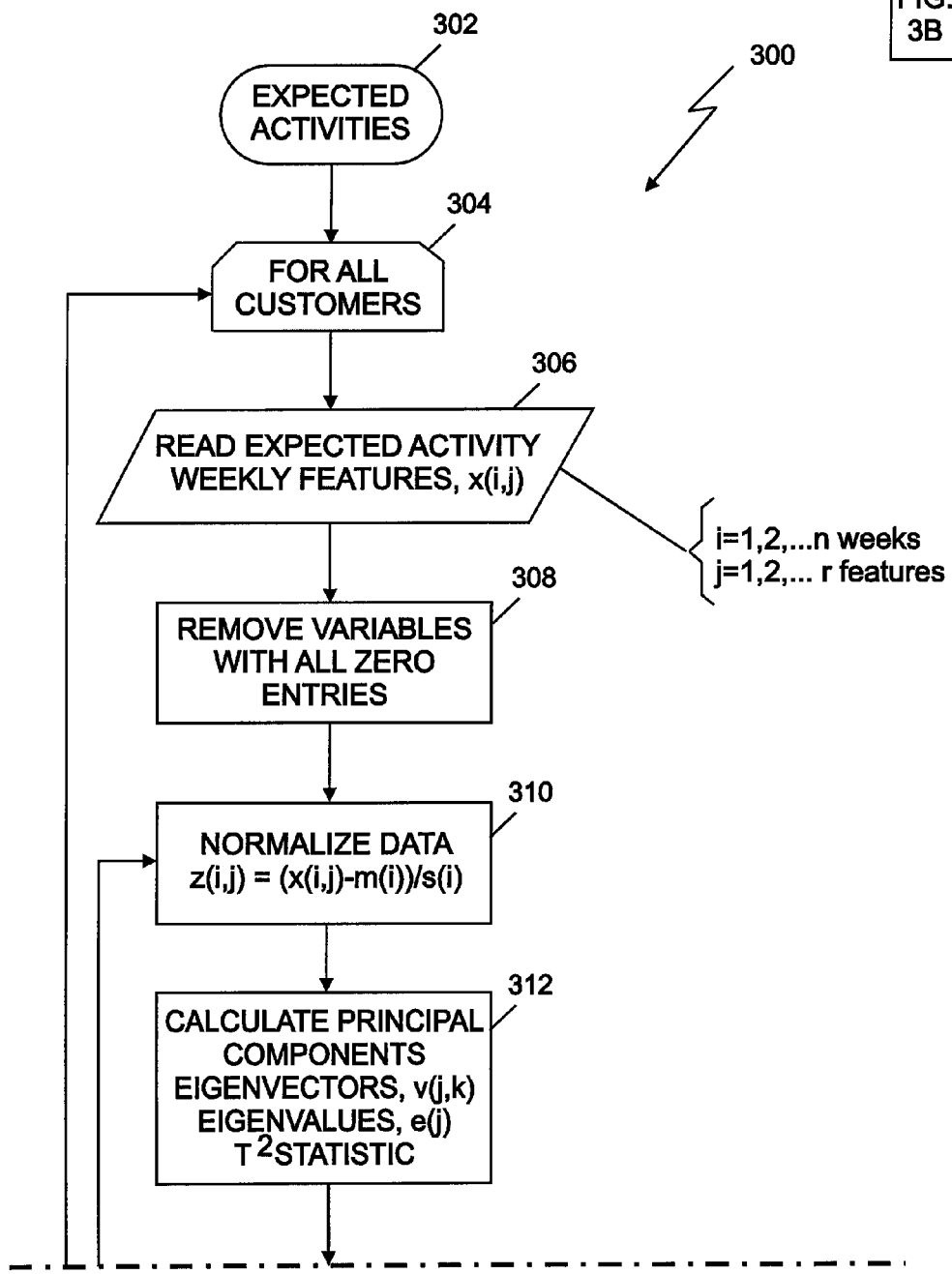

METHOD AND SYSTEM FOR ANTI-MONEY LAUNDERING SURVEILLANCE

BACKGROUND OF THE INVENTION

The present invention relates to financial systems, financial transactions and the like, and more particularly to a method and system for anti-money laundering surveillance or to detect other anomalies related to financial transactions or use of financial systems.

With the use of financial systems, products, transactions and the like by politically violent individuals and other dishonest individuals to finance and support their activities, monitoring financial transactions and detecting any anomalies has become an important aspect of identifying such activities and their participants. Additionally, governments have promulgated guidelines and regulations to detect and monitor such transactions and use of financial systems and products.

BRIEF SUMMARY OF THE INVENTION

In accordance with an embodiment of the present invention, a method for anti-money laundering surveillance may include analyzing transaction data based on a group that may include at least one of peer comparison, expected level of activity and debit/credit flow through. The method may also include generating an alert in response to one or more predetermined results from the analyzing.

In accordance with another embodiment of the present invention, a method for anti-money laundering surveillance may include converting raw transaction data to daily summary transaction data. The method may also include converting daily transaction data to a group that may include peer comparison of average transaction volume and structuring activity data, exception from expected historical level of activity data, and volume and velocity of transactions or debit/credit flow through activity data. The method may also include applying an outlier-shooting algorithm to the activity data to identify any outliers and to assign a risk score. The method may further include generating any alerts based on a selected threshold.

In accordance with another embodiment of the present invention, a system for anti-money laundering surveillance may include a processor and at least one of a peer comparison module, an expected level of activity module, and a debit/credit flow through module.

In accordance with another embodiment of the present invention, a computer program product for anti-money laundering surveillance may include a computer usable medium having computer usable program code embodied therewith. The computer usable medium may include computer usable program code configured to analyze transaction data based on a group that may include at least one of peer comparison, expected level of activity, and debit/credit flow through. The computer usable medium may also include computer usable program code configured to generate an alert in response to one or more predetermined results from the analyzing.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 1 is a flow chart of an example of a method for anti-money laundering monitoring or surveillance in accordance with an embodiment of the present invention.

FIGS. 2A and 2B (collectively FIG. 2) are a flow chart of an example of a method for debit/credit flow through data for a chosen time period in accordance with an embodiment of the present invention.

DETAILED DESCRIPTION OF THE INVENTION

Figure 2A:
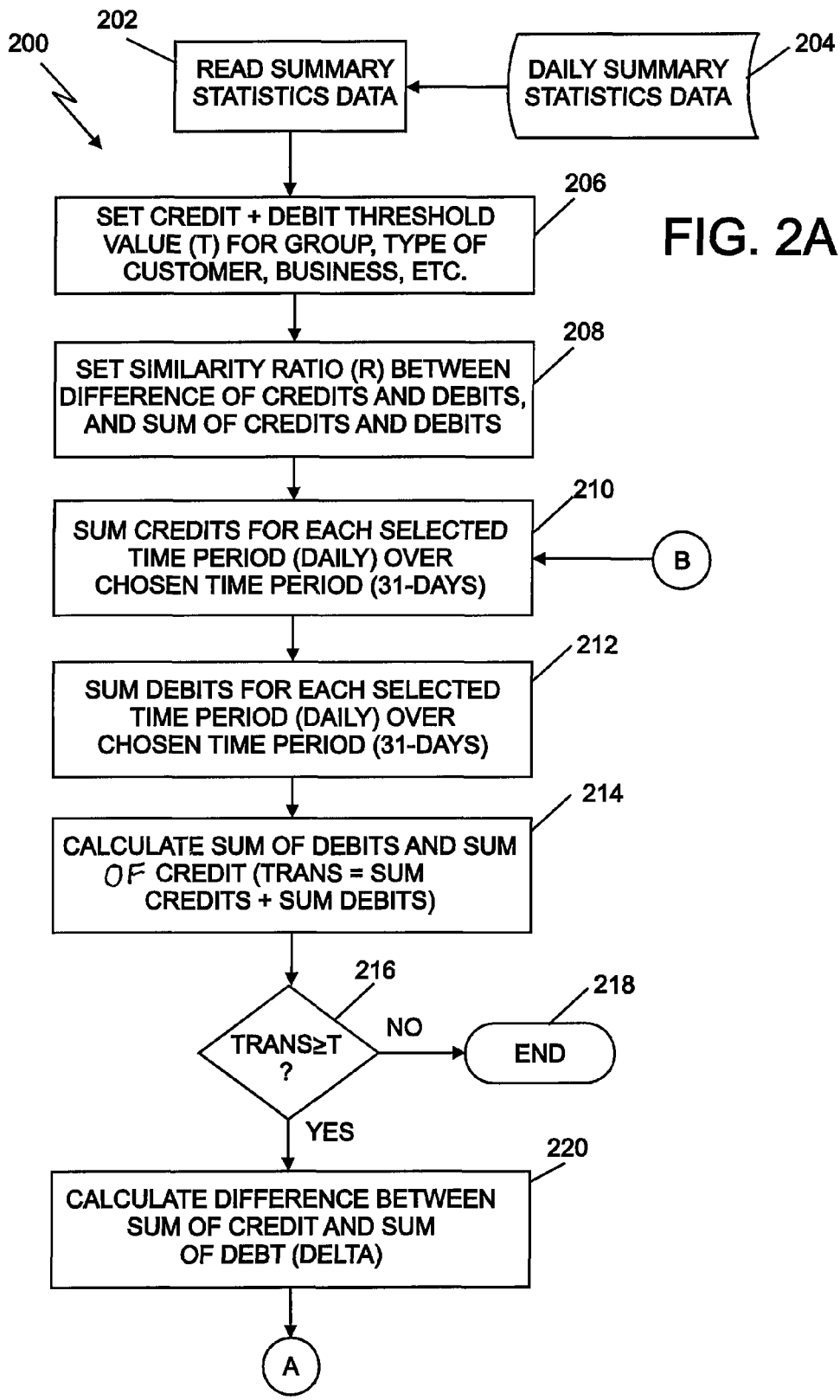

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium, for example medium 722 in FIG. 7, having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or block.

FIG. 1 is a flow chart of an example of a method 100 for anti-money laundering (AML) monitoring or surveillance in accordance with an embodiment of the present invention. In block 102, raw transaction data 104 may be converted to predetermined time segments. For example, the raw data may be converted to daily statistical transaction data (converted statistical data 106), or data based on some other convenient time frame to reduce the amount of data or to facilitate analysis and identifying any anomalies. The raw data may be collected by entity.

The data may also be filtered. Only transactions above a certain monetary amount, for example $30 or some other amount, may be considered. Debits and credits may be accumulated for each predetermined time segment or daily.

Examples of the converted statistical data 106 for a daily time period may include information such as identification (ID) of each entity of interest; a reference ID associated with each transaction of interest; a transaction date; number of credit transactions in the day associated with each entity, ID, reference ID, customer, business name or other identifying information; sum of credit transactions (monetary value) during the time period or day associated with each entity; number of debit transactions in the time period or day associated with each entity; sum of debit transactions (monetary value) in the day for each entity; sum of number of credit transactions within a predetermined range (for example between about $8,000 and $10,000) in the day; sum of number of debit transactions within the predetermined range in the day; accumulated sum of credit transactions within the predetermined range in the day; accumulated sum of debit transactions within the predetermined range in the day; customer name; business name; or similar information. Each of these types of data may correspond to a column in a database or spreadsheet.

The AML surveillance method 100 or tool may then process the converted statistical data to generate at least three different sets of statistical data and to perform analysis related to each of the sets of data to generate any alerts or alarms based on any anomalies, changes in transaction patterns, exceeding preset scores or parameters as described in more detail herein. The three sets of data and analysis may include peer comparison data and analysis, expected activity and analysis and volume and velocity of transactions data and analysis, which may also be referred to as debit/credit flow through. The present invention is not intended to be limited to these particular sets of data and analysis. Other data and analysis may also be performed that may facilitate AML surveillance and identification of entities that may be involved in such activities. As used herein an entity may be a customer of a financial institution or the like, an account or any label that may be used to identify participants, whether they are individuals, organizations or other entities.

In block 108, peer comparison data 110 may be generated from the converted statistical data 106. Generating the peer comparison statistical data 110 may involve a process including accumulating all credits (monetary value) for a given date; accumulating the number of all credits for the given date; accumulating all debits (monetary value) for the given date; accumulating the number of debits for the given date; accumulating the monetary amount of all transactions (debit+credit) between a predetermined range (for example $8K-$10K) for the given date; and accumulate the number of transactions (debit and credit) for the predetermined range for the given date. This process may be repeated for each transaction date of interest and may be done only for transactions above a minimum threshold, such as about $30 or some other threshold.

In block 112, peer comparison data 110 may be analyzed and an alert 114 may be generated in response to an outlier or significant deviation in behavior from a peer comparison of the peer data 110. The analysis in block 112 may involve comparing the peer comparison data 110 to analyze patterns of behavior among similar types of entities. Different rules, such as business rules or particular parameters of an institution based on past experience of identifying entities that may be involved in money laundering or similar activities may be applied. An "Outlier-Shooting Algorithm" or module may be used to identify outliers or deviations in behavior for generating an alert for closer observation or other action. An example of an Outlier-Shooting algorithm is described in more detail below. Briefly described, outliers may be determined using distance measured from a reference point. The reference point may be the "median" statistics of customers or entities in the peer group. The distance calculation may be performed using the Outlier-Shooting Algorithm. The Outlier-Shooting Algorithm may include parameter optimization using "Sequential Quadratic Programming." The optimization process may include repetitively finding a weighted distance that is as far as possible from a reference point. The weighted distance found by optimization technique is employed to make sure that any outlier behavior from any variable or input feature statistics, such as peer comparison data 110 produced in block 108, will be amplified and detected as an outlier.

There may be an adjustable parameter called a Peer Outlier Threshold, TcH. The Peer Outlier Threshold may be used to determine an outlier in a principal component distance calculation. The threshold may typically be set to 3 standard deviations.

In block 116, expected activity data 118 for a preset time period may be generated from the converted statistical data 106. The preset time period may be a week; although, any time period that may be convenient for performing the particular analysis may be used. The process of generating the expected activity data 118 from daily statistical data 106 using a preset time period of a week may involve determining a sum of the number of transactions; sum of monetary amount of the transactions; sum of number of transactions within a predetermined range; sum of number of credits; sum of monetary amount of credits; or similar calculations depending upon the type activities being monitored and analyzed.

Ratio statistics may also be determined in block 116 which may include value of monetary transactions to number of transaction days; number of credits to number of transactions; monetary amount of credits per monetary amount of transactions. These ratios may be determined for all weeks for which expected activity is being evaluated.

In block 120, expected alert data 122 for preset time periods may be generated. The process may involve converting the expected activity data 118 into predetermined alert statistics that may summarize a deviation or distance from an expected level of activity. The statistics may involve determining Kurtosis of distance, a sum of monetary outlier transactions, an average money value of outlier transactions (sum amount/number of transactions), and average amount of transactions per week of outlier transactions (sum amount/ number of weeks). This statistical data is intended to capture historical anomalies such as spikes, surges or shifts in an entities transactional behavior. An exemplary method to generate expected activity alert data will be described in more detail with reference to FIG. 3.

In block 124, expected activity alert data 122 may be analyzed and an alert 114 may be generated in response to any anomalies, such as a spike, shift, surge or other significant departure from historical patterns for an entity. Rules, such as business rules or other parameters may be applied in analyzing the expected activity alert data 124. The process in block 124 may involve calculating an alert score using an empirical cumulative density function (CDF). Monetary sums of outlier transactions for each of the preset time periods may be sorted over the entire time period of the analysis. The empirical CDF may be applied to rank order the sums of outlier transactions. An alert may be generated in response to a probability of a sum of outlier transactions being larger than a specified threshold value. An exemplary method to analyze expected activity alert statistical data and generate any alert will be described in more detail with reference to FIG. 5.

In block 126, debit/credit flow through data 128 may be generated for a chosen time period from the converted statistical data 106 that may be daily summary transaction data. The chosen time period may be a 31-day time period or other time period that facilitates detecting money laundering or other illicit activity. The debit/credit flow through data may be calculated using the following criteria: (1) a debit/credit (D/C) Flow Through Threshold which may be a minimum monetary amount transaction (the sum of credits and debits). Only those transactions that are larger than this threshold may be counted. And (2) a D/C Similarity Ratio which may be defined as the ratio between the difference of credit and debit amount divided by the total transactions (credit+debit). In other words, only those transactions smaller than the ratio (|$ credit−$ debit|/|$ credit+$ debit|) are counted. The purpose of these criteria is to isolate bulk or transactions involving significant amounts of money in-and-out that are almost equal. An example of a method 200 for determining flow through data for a chosen time period will be described in more detail with reference to FIG. 2.

In block 130, debit/credit flow through alert data 132 may be generated from the debit/credit flow through data 128. The debit/credit flow through data 128 may be daily flow through data and may be converted into weekly summary statistical data 132 that may be used by an alert generation module in block 134. Four similar statistics may be generated in block 130 involving 2 elements: sum of flow through transaction money and number of transaction days. The differences between the four statistics may be the periods in which the summations are performed. For example one statistic may be for a 1-7 day period, the second for 8-14 day period, a third for 15-21 day period and the fourth for 22-31 day period. Accordingly, the 31-day summary statistics may be separated into alert data for a given time period which in this example may be seven days each over a 31-day period.

In block 134, an alert 114 may be generated in response to debit/credit flow through analysis exceeding a preset score or limit. The volume, speed and frequency of transactions may be analyzed to determine any entities with transactions exceeding the preset score to generate the alert 114. As with peer comparison analysis and expected activity analysis, business rules or other criteria may be applied in analyzing the flow through data.

The analysis and alert generation process in block 134 may involve calculating an alert score using an empirical cumulative density function (CDF). The CDF may include sorting a monetary Sum of outlier transactions and assigning a probability value empirically to rank order the outlier transactions. An alert 114 may be generated if the probability value is larger than a specified threshold. An exemplary method for analyzing debit/credit flow through alert data and generating an alert in response thereto will be described with reference to FIG. 6.

The alerts from each of the peer comparison analysis and alert generation in block 112, expected activity analysis and alert generation in block 124, and flow through analysis and alert generation in block 134 may be used to generate an overall alert in block 136. In block 136, overall alerts may be generated based on three high level statistics: (1) peer distance summary statistic, (2) expected level of activity summary statistic, and (3) debit/credit flow through summary statistic. Alerts may be generated based on relative comparisons among the customers or entities within a surveillance group. Multivariate statistical comparisons to relatively rank customers may be conducted using the Outlier-Shooting Algorithm.

One of the main tenets of customer or entity transaction activity surveillance is to identify unusual, inconsistent, or unexpected patterns in comparison with those of similar entities. This may be done using the Outlier-Shooting Algorithm. In statistical terms, the Outlier-Shooting Algorithm may involve identifying transaction patterns that significantly deviate from the "median" of a population. These deviations can be considered as "outliers" or can be referred to as "outliers." Mathematically, this relationship can be formulated as an optimization function similar to that expressed in equation (1).

$$S = \underset{w^*}{\mathrm{argmax}} \left[ \underset{x_i^*}{\mathrm{argmax}} \{w^T x_i - \mathrm{median}(w^T x_i)\}_+ \right] \quad i = 1, 2, \ldots, m \quad (1)$$

$$\text{Subject to } w^T w = 1$$

A set of "optimal" weighting factors, w, can be found that maximizes the distance between the most extreme customer or entity to the median where $x_i$ may be the three main feature statistics (peer comparison, expected level of activities, and flow through described herein) of the $i^{th}$ customer or entity. The $\{.\}_+$ sign is to maximize only in the direction of $x_i$ that are larger than median. Note that the larger the feature statistics $x_i$, the riskier the customer or entity may be. The overall risk statistics for the $i^{th}$ customer is $y_i = w^T x_i - \mathrm{median}(w^T x_i)$. The customer with the highest value of $y_i$ is the riskiest. When $x_i$ is normally distributed then y is also normally distributed. An outlier is identified if $y_i > \mu_y + 3\sigma_y$, where $\mu_y$ and $\sigma_y$ are the mean and the standard deviation of y, respectively. Once the $i^{th}$ customer is identified as an outlier, it may be flagged and excluded from the analysis, and the optimization process may be repeated until no further outlier is found. Once no more outliers are found, the "weighted-distance" risk statistics, $y_i = w^T x_i - \mathrm{median}(w^T x_i)$ may be applied to the remaining data. An exemplary implementation of the Outlier-Shooting process or algorithm is illustrated in the following code listing:

```
function s=find_score(xorg)
% Outlier-shooting algorithm
[m,n]=size(xorg);
global z;
% initialize variables
w0=ones(n,1); % initial weighting factors
flagY=zeros(m,1); % initialize outlier flags
idxY=(1:m)';
s=zeros(m,1);
% iterate to find outliers
while 1
    noflag=find (flagY==0);
    x=xorg(noflag,:); % use sample data that are not flagged
    idx=idxY(noflag);
    [mx,nx]=size(x);
    meanx=mean(x);
    stdx=std(x);
    stdx=(stdx>0).*stdx+(stdx<=0).*ones(1,nx);
    z=(x-ones(mx,1)*meanx)./(ones(mx,1)*stdx); % normalized statistics
    options=optimset('LargeScale','off','Display','off');
    w=fmincon(@dist,w0,[ ],[ ],[ ],[ ],[ ],[ ],@confun,options);
    % call optimization routine to optimize weighting factors
    medz=median(z);
    omedz=ones(mx,1)*medz;
    zpos=z-omedz; % calculate coordinate distance to the median
    y=zpos*w; % calculate weighted distance
    w0=w;
    iy=find (y>mean(y)+3*std(y)); % find outliers using 3 sigma threshold
    if length(iy>0)
        [ym,iy]=max(y); % select maximum distance as outliers
        idout=idx(iy);
        s(idout)=y(iy);
        ss=s(idout);
        flagY (idout)=ones(length(idout),1); % flagged ouliers
    else
        s(idx)=y;
        break;
    end
end;
% routine to calculate maximum distance
function f=dist(w)
global z;
medz=median(z);
[mz,nz]=size(z);
distz=z-ones(mz,1)*medz; % calculate distance to median
zpos=distz>0; % consider only those larger than median
y=(distz.*zpos)*w; % calculated weighted distance score
y=max(y); % calculate maximum distance
f=-y; % negate because the function is a minimization function
% function to constraint w so that w'w=1
function [c, ceq]=confun(w)
c=[ ];
ceq.w*w-1;
```

FIGS. 2A and 2B (collectively FIG. 2) are a flow chart of an example of a method 200 for debit/credit flow through data for a chosen time period in accordance with an embodiment of the present invention. The method 200 may be used to generate the debit/credit flow through data for a chosen time period in block 126 of FIG. 1.

In block 202, summary statistics data, such as daily summary statistics data 204 may be read. The summary statistics data may be for any time period that is convenient for the transaction data available, the analysis to be performed and the time frame of interest. In block 206, a credit+debit (C/D) threshold value (T) may be set for the entity which may be a group, type of customer, business or the like. The threshold value (T) may be different for different entities or types of entities. In block 208, a similarity ratio (R) threshold may be set between a difference of credits and debits and a sum of credits and debits. As an example, the similarity ratio (R) threshold may be about 0.15 and is a measure of the similarity of the different transactions between different entities. A similarity threshold (R) greater than the threshold may be an indication that the transactions may be somewhat dissimilar. The similarity ration may be different for different entities, businesses, types of customers or the like.

In block 210, a sum of credits for each selected time period (for example a daily sum) may be calculated over a chosen time period, such as a 31-day period or other convenient time period. In block 212, a sum of debits for each selected time period over the chosen time period may be calculated.

In block 214, a sum of debits and a sum of credits may be calculated to provide a sum of transactions (TRANS=SUM CREDITS+SUM DEBITS). In block 216, a determination may be made if the sum of transactions monetary amount is greater than the C/D threshold value (TRANS≥T). If not, the method 200 may end at termination 218. If TRANS is greater than or equal to the C/D threshold T, the method 200 may advance to block 220. In block 220, a difference between the sum of credits and the sum of debits (DELTA) may be calculated.

In block 222, a ratio of DELTA to TRANS (RATIO=DELTA/TRANS) may be calculated. A determination may be made in block 224 if the ratio is less than the similarity ratio (R). If not, the method 200 may advance to block 226 and the method 200 may end at termination 226. If the ratio determined in block 222 is less than the similarity ratio R is block 224, the method 200 may advance to block 228. In block 228, a total value of transactions (monetary value of credits+monetary value of debits) for the selected time period (may be daily) may be accumulated.

In block 230, a total number of transactions for the selected time period may be accumulated. In block 232, transactions used in the calculations may be flagged to avoid double counting in other calculations.

In block 234, a determination may be made if there are more selected time periods within the chosen time period of interest. If so, the method 200 may return to block 210 to generate flow through statistical data for the next selected time period. If accumulated totals have been determined for all selected time periods within the chosen time period of interest, the method 200 may output the flow through data 236 for the chosen time period which may be similar to the debit/credit flow through data 128 of FIG. 1 and may include the accumulated total value of transactions and accumulated number of transactions for each selected period.

Figure 3B:
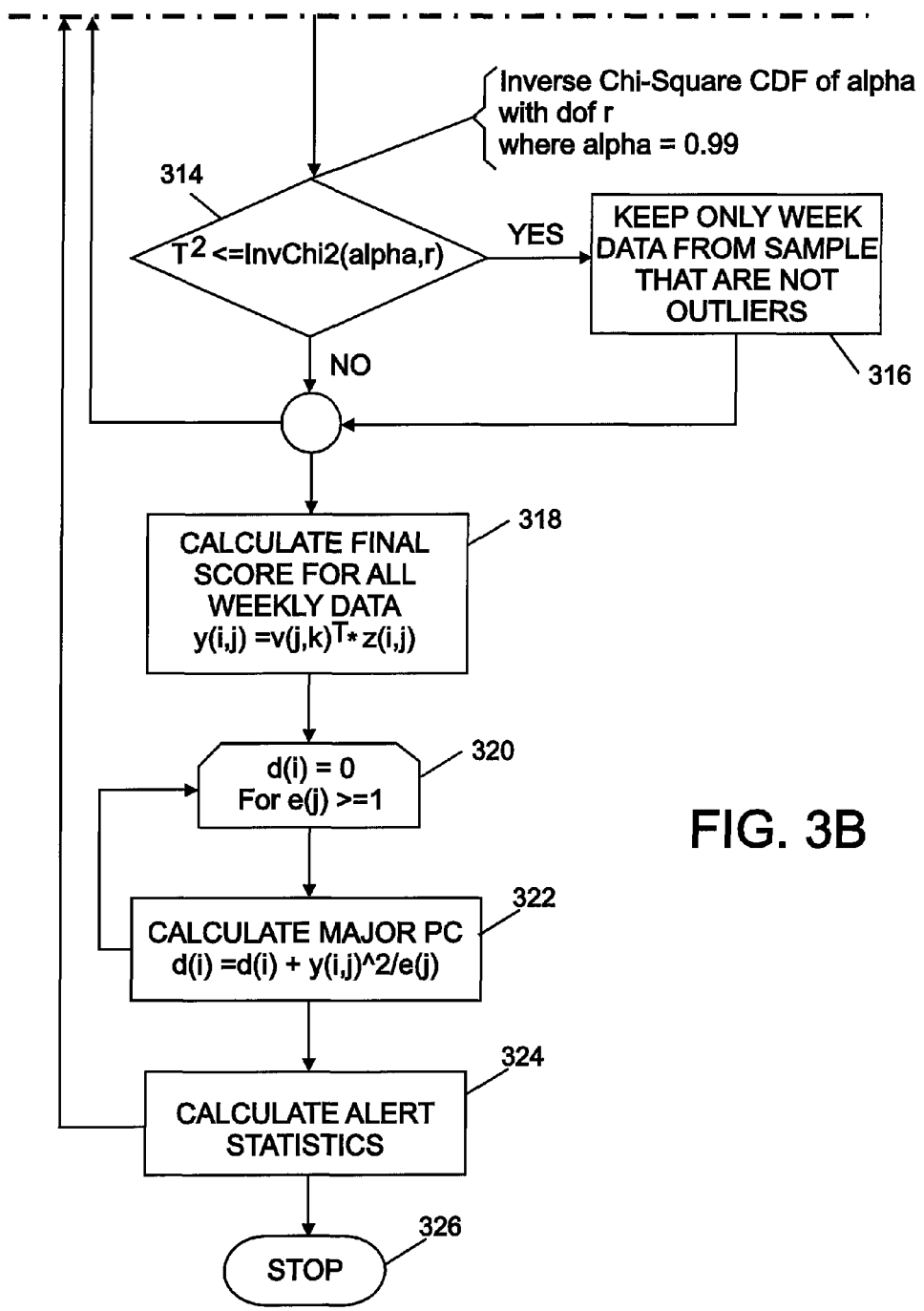
FIG. 3 is a flow chart of an example of a method to generate expected level of statistics data in accordance with an embodiment of the present invention.

FIG. 3 is a flow chart of an example of a method 300 to generate expected activity alert statistical data in accordance with an embodiment of the present invention. The method 300 may be used to generate the expected activity alert data 122 from block 120 of the method 100 in FIG. 1. Expected activities 302 for all customers 304 or entities of interest may be read or inputted in the system in block 306. The expected activities 302 may be financial transactions.

In block 308, variables with all zero entries may be removed. In block 310-316, outlier weeks (or other convenient time frame) may be iteratively removed using multivariate hypothesis test. In block 310, the data may be normalized. In block 312, principal components may be calculated. Block 312 may include a principal component function or the like. The principal component routine may return two outputs which may include Eigenvectors and Eigenvalues. Principal components where the Eigenvalues are greater than or equal to 1 may be retained. Hoteling-$T^2$ statistics may be calculated for the retained principal components in block 312. In block 314, outliers may be removed using a Chi-square test. In block 316, only week data (or other selected time frame data) from samples that are not outliers are keep.

In block 318, distance or deviation from expected activity for an entire week or other selected time frame may be calculated. In block 322, all major principal components (PC) may be calculated for Eigenvalues greater than or equal to 1 from block 320. In block 324 summary statistics or expected activity alert data may be calculated and saved to a file (expected activity alert data 122 in FIG. 1). The method 300 may return to block 304 and may proceed as previously discussed for all customers or entities of interest. The method 300 may end at termination 326.

Figure 4:
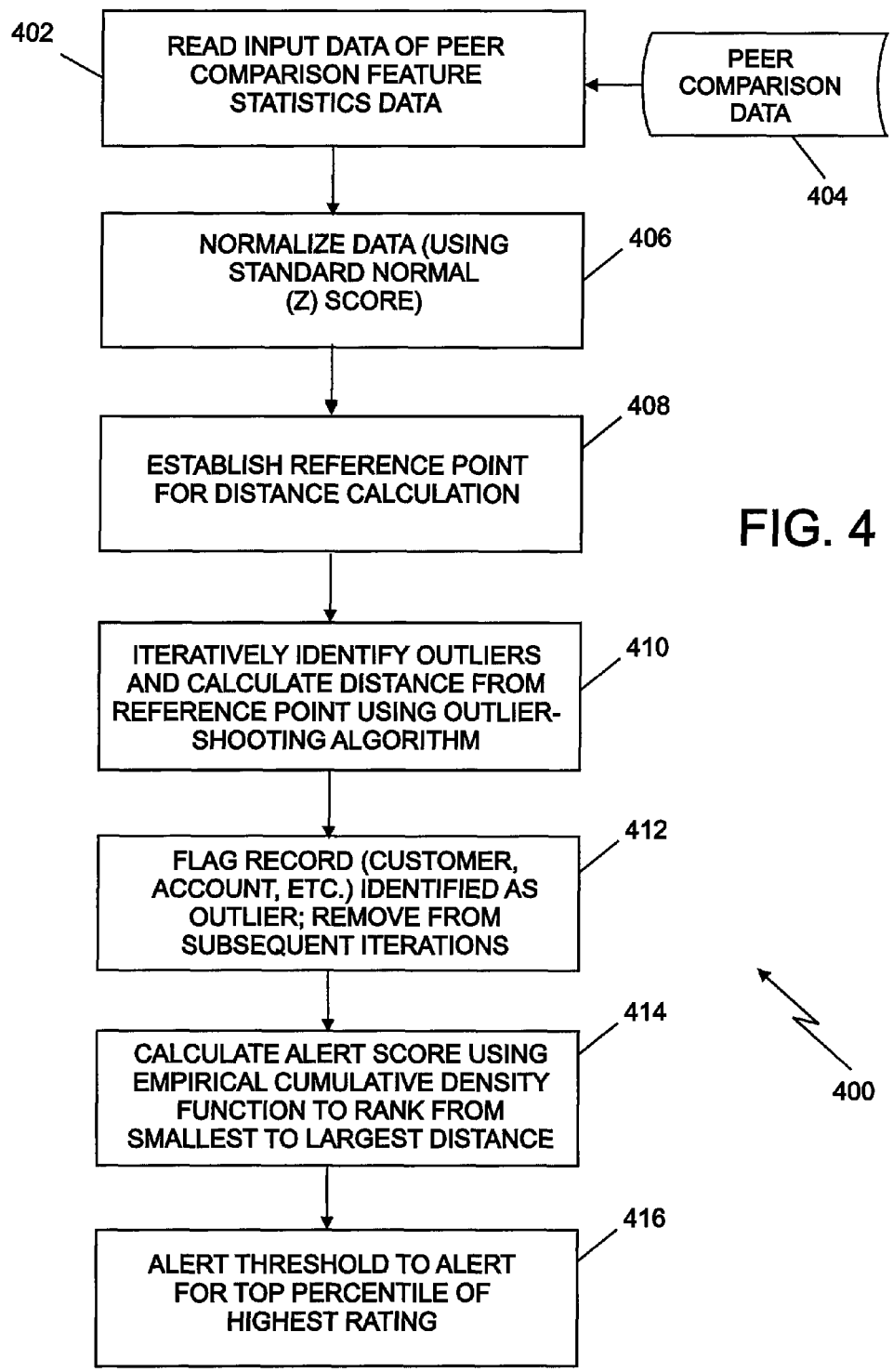
FIG. 4 is a flow chart of an example of a method to generate an alert in response to a peer comparison outlier or anomaly in accordance with an embodiment of the present invention.

FIG. 4 is a flow chart of an example of a method 400 to generate an alert in response to a peer comparison outlier or anomaly in accordance with an embodiment of the present invention. The method 400 may be used to analyze peer comparison data and generate a peer comparison outlier alert in block 112 of FIG. 1. In block 402, peer comparison feature statistics data 404 may read or inputted into a system for AML surveillance. In block 406, the data may be normalized. The data may be normalized using a standard normal (z) score or similar process.

In block 408, a reference point may be established for distance calculation. In block 410, outliers may be iteratively identified and a distance from the reference point may be calculated using the outlier-shooting algorithm previously described. In block 412, a record, customer, account or the like may be flagged in response to being identified as an outlier. The record may be removed from subsequent iterations.

In block 414, an alert score may be calculated using an empirical cumulative density function (CDF) to rank the records from smallest to largest distance from the reference point. In block 416, an alert threshold may be established to alert for a predetermined top percentile of highest ranking records or entities.

Figure 5:
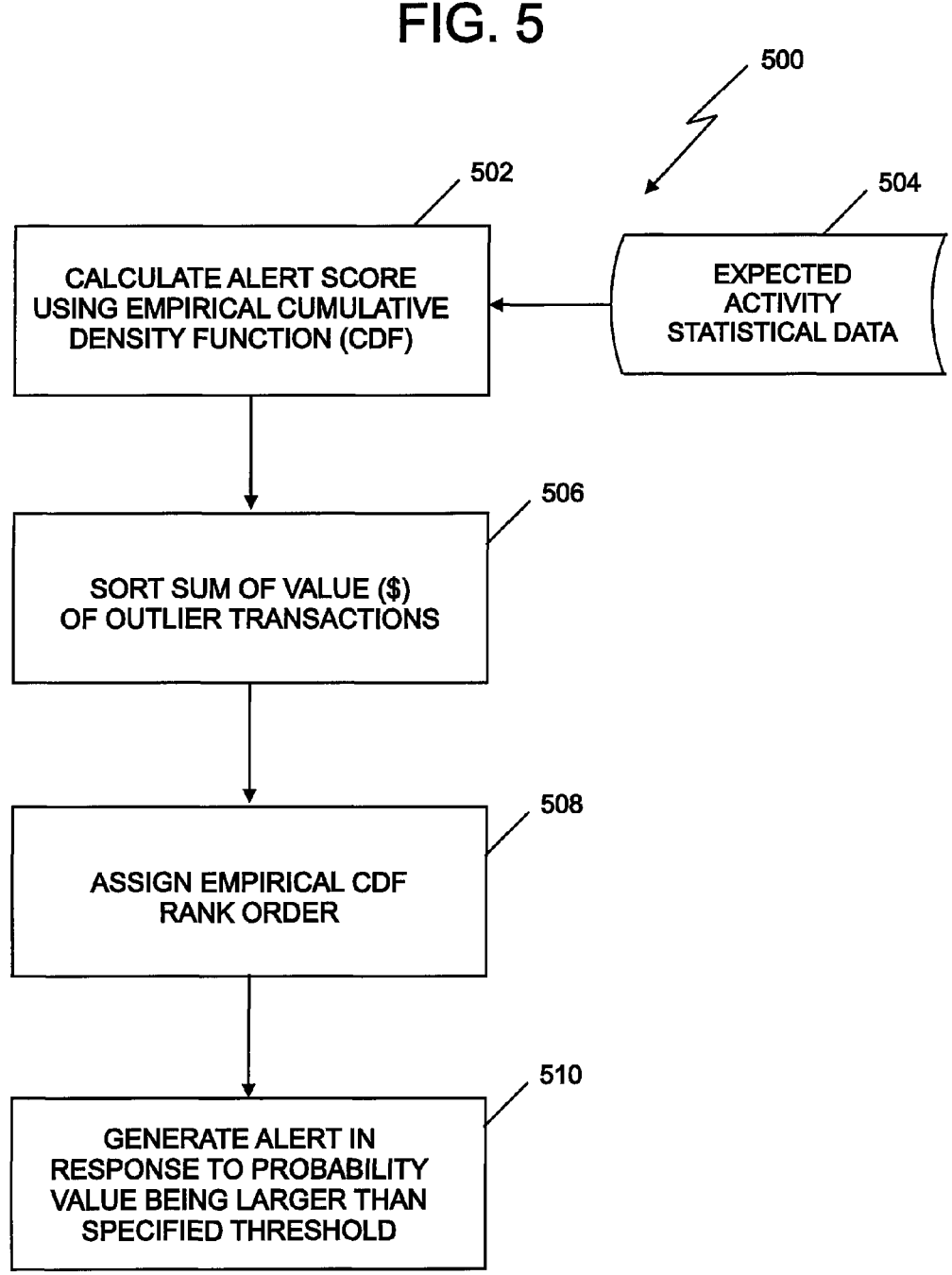
FIG. 5 is a flow chart of an example of a method to generate an alert in response to an anomaly in expected activity in accordance with an embodiment of the present invention.

FIG. 5 is a flow chart of an example of a method 500 to generate an alert in response to an anomaly in expected activity in accordance with an embodiment of the present invention. The method 500 may be used to analyze data and generate an expected activity alert in block 124 of FIG. 1. In block 502, an alert score may be calculated using an empirical cumulative density function (CDF) applied to the expected activity statistical data 504. The expected activity statistical data 504 may be the same as the data 122 of FIG. 1.

In block 506, a sum of monetary value of outlier transactions may be sorted. In block 508, an empirical CDF rank may be assigned to sum of outlier transactions. In block 510, an alert may be generated in response to a probability value being larger than a specified threshold.

Figure 6:
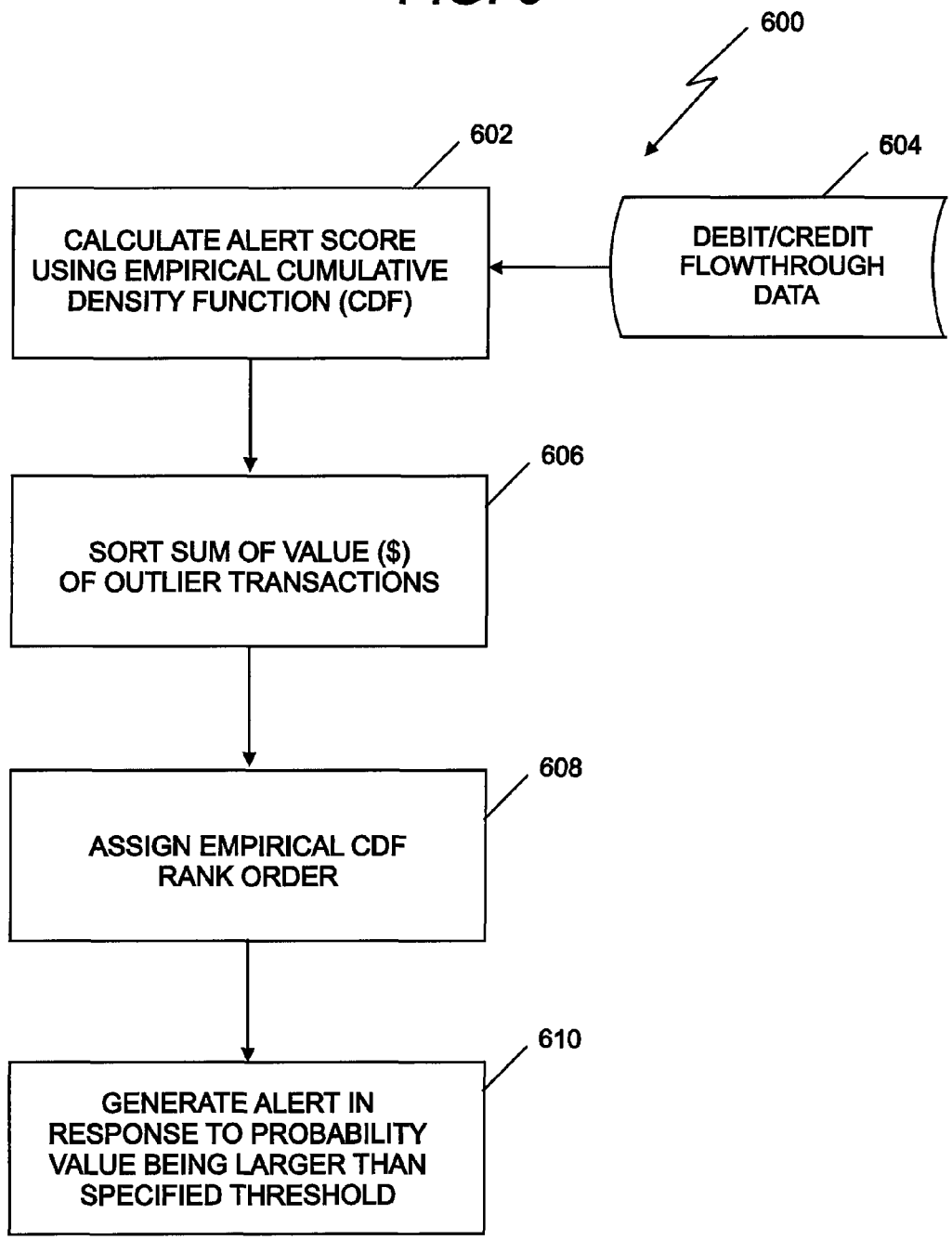
FIG. 6 is a flow chart of an example of a method to generate an alert in response to debit/credit flow through exceeding a predetermined score in accordance with an embodiment of the present invention.

FIG. 6 is a flow chart of an example of a method 600 to generate an alert in response to debit/credit flow through exceeding a predetermined score in accordance with an embodiment of the present invention. The method 600 may be used for the analyze data and generate a flow through alert function of block 134 in FIG. 1. In block 602, an alert score may be calculated using an empirical cumulative density function (CDF) based on the debit/credit flow through data 604. The debit/credit flow through data may be the same as the alert data 132 of FIG. 1.

In block 606, sums of monetary values of outlier transactions may be sorted. In block 608, an empirical CDF rank order may be assigned to the sums. In block 610, an alert may be generated in response to a probability value being larger than a specified threshold.

Figure 7:
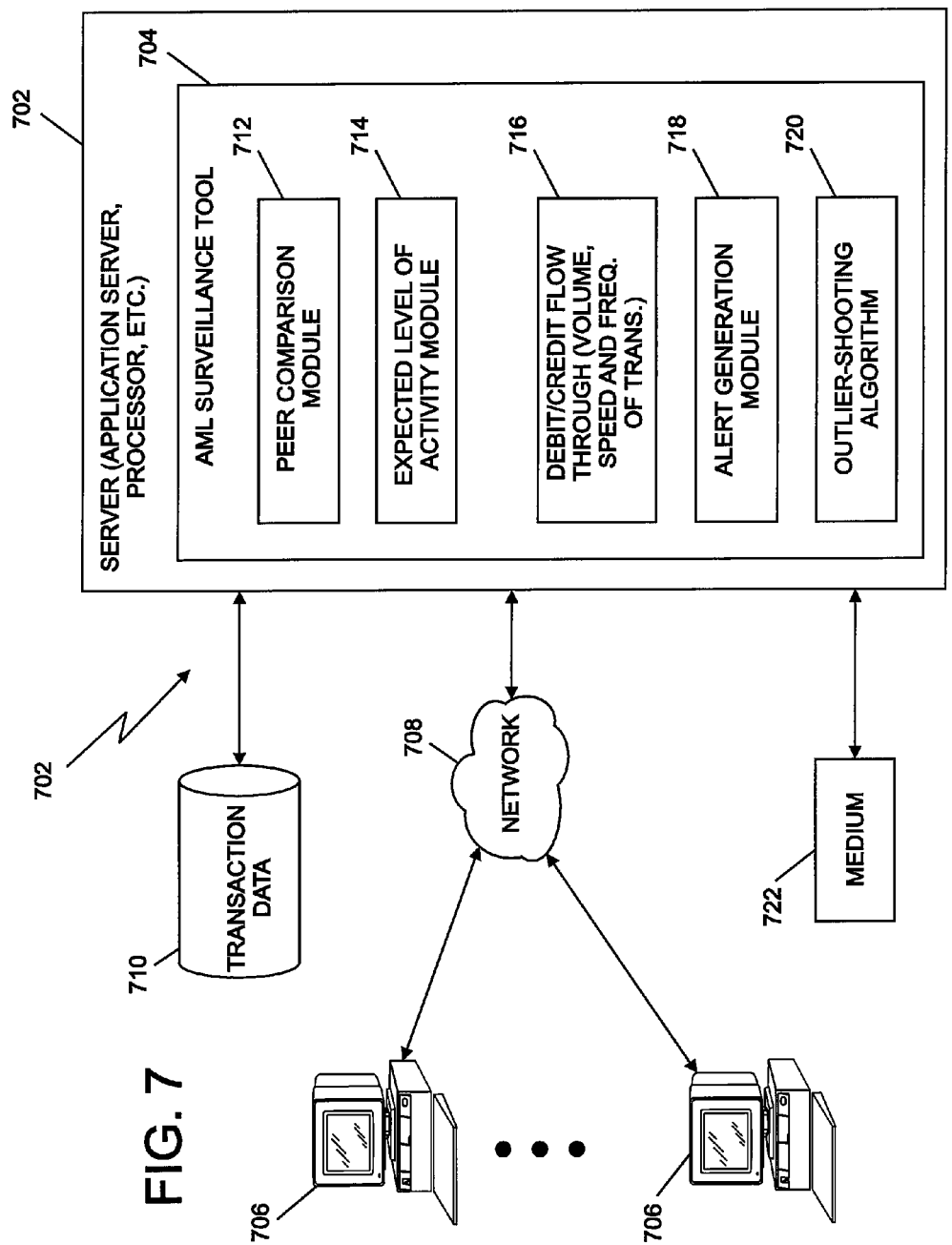
FIG. 7 is block diagram of an example of a system for anti-money laundering surveillance in accordance with an embodiment of the present invention.

FIG. 7 is block diagram of an example of a system 700 for anti-money laundering (AML) surveillance in accordance with an embodiment of the present invention. The methods 100, 200, 300, 400, 500 and 600 of FIGS. 1-6 respectively may be embodied in the system 700. The system 700 may include a server 702. The server 702 may be an application server or similar server and may include a processor. An AML surveillance tool 704 or application may be operable on the server 702 or processor. The server 702 may be accessed by one or more clients 706 via a network 708. The network 708 may be the Internet, an intranet or other private network. The AML surveillance tool 704 may acquire transaction data from a transaction database 710 or other data store for performing AML analysis and generating alerts similar to that previously described.

The AML surveillance tool 704 may include a peer comparison module 712, an expected level of activity module 714, a debit/credit flow through module 716 or other modules that may facilitate AML surveillance. The peer comparison module 712 may embody blocks 108 and 112 of method 100 of FIG. 1 and method 400 of FIG. 4. Accordingly, the peer comparison module 712 may analyze transaction data related to peer comparison and generate a peer comparison alert in response to an outlier based on analysis of transaction patterns compared to similar entities as previously described.

The expected level of activity module 714 may embody blocks 116, 120, and 124 of method 100 of FIG. 1, method 300 of FIG. 3, and method 500 of FIG. 5. The expected activity module 714 may perform analysis on transaction data related to expected activity statistical data and may generate an expected activity alert in response to a predetermined change in historical transaction patterns for a particular entity.

The debit/credit flow through module 716 may embody blocks 126, 130, and 134 of the method 100, and method 200 of FIG. 2, and method 600 of FIG. 6. The debit/credit flow through module 716 may analyze transaction data related to volume, speed and frequency of transactions and may generate a flow through alert in response to the debit/credit flow through exceeding a preset score or limit.

The AML surveillance tool 704 may also include an alert generation module to generate a respective, predetermined alert in response to certain conditions or results from each respective module 712, 714, and 716. In another embodiment of the present invention, the alert generation module 718 or appropriate portions of the alert generation module 718 may be incorporated in the respective modules 712, 714, and 716.

The AML surveillance tool 704 may also include an outlier-shooting algorithm or module 720. As previously described, the outlier-shooting algorithm may be applied to the transaction data to identify any outliers or statistical data associated with an entity which significantly deviates from a reference point or expected level of activity. In another embodiment of the present invention the outlier-shooting algorithm 720 or appropriate portions of the algorithm 720 may be incorporated in the respective modules 712, 714 and 716.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for anti-money laundering surveillance, comprising:
    analyzing transaction data based on a group comprising: peer comparison, expected level of activity, and debit/credit flow through based on volume and velocity of transaction data;
    generating, via a computing device processor, peer comparison statistical data, expected activity statistical data for a preset time period, and debit/credit flow through statistical data for a chosen time period;
    using an outlier-shooting algorithm to identify one or more outliers in the peer comparison statistical data, wherein using the outlier-shooting algorithm to identify the one or more outliers comprises:
        determining a median value for the peer comparison statistical data;
        determining a datum point having a largest distance value from the medium value of the peer comparison statistical data;
    generating a peer comparison alert when the largest distance value of the datum point for the peer comparison statistical data exceeds an outlier threshold associated with the peer comparison statistical data; and
    generating an alert in response to one or more predetermined results from the analyzing comprising:
        generating an expected activity alert in response to a predetermined change in historical transaction patterns; and
        generating a flow through alert in response to the debit/credit flow through exceeding a preset score.

2. The method of claim 1, further comprising collecting the transaction data by entity.

3. The method of claim 1, further comprising applying any rules to analyzing the transaction data.

4. The method of claim 1, further comprising identifying any outliers using an outlier-shooting algorithm.

5. The method of claim 1, wherein generating alerts comprises identifying any outliers or risk merits based on a premise that a particular entity should behave similarly or differ within a predetermined acceptable range of variation.

6. The method of claim 1, further comprising:
    converting raw transaction data to daily summary transaction data;
    converting daily transaction data to a group including: peer comparison of average transaction volume and structuring activity data, exception from expected historical level of activity data, and volume and velocity of transactions or debit/credit flow through activity data;
    applying an outlier-shooting algorithm to the activity data to identify any outliers and to assign a risk score; and
    generating any alerts based on a selected threshold.

7. A method for anti-money laundering surveillance, comprising: converting raw transaction data to daily summary transaction data;
    converting daily transaction data to a group of activity data including:

peer comparison of average transaction volume and structuring activity data, exception from expected historical level of activity data, and volume and velocity of transactions or debit/credit flow through activity data;

applying, via a computing device processor, an outlier-shooting algorithm to the group of activity data to identify one or more outliers and to assign a risk score, wherein applying the outlier-shooting algorithm to identify the one or more outliers in the group of activity data comprises:

determining a median value for each of the peer comparison of average transaction volume and structuring activity data, exception from expected historical level of activity data, volume and velocity of transactions or debit/credit flow through activity data;

determining a datum point having a largest distance value from the medium value for each of the peer comparison of average transaction volume and structuring activity data, exception from expected historical level of activity data, volume and velocity of transactions or debit/credit flow through activity data;

generating an alert when any one of the largest distance values of the data points for any one of the peer comparison of average transaction volume and structuring activity data, exception from expected historical level of activity data, volume and velocity of transactions or debit/credit flow through activity data meets or exceeds a selected threshold associated with each of the peer comparison of average transaction volume and structuring activity data, exception from expected historical level of activity data, volume and velocity of transactions or debit/credit flow through activity data.

8. The method of claim 7, wherein applying the outlier-shooting algorithm comprises identifying any transaction patterns that significantly deviate from a median of a population.

9. The method of claim 7, wherein applying the outlier-shooting algorithm comprises identifying any unusual, inconsistent or unexpected patterns associated with an entity in comparison to like patterns of types of entities having like characteristics as the entity.

10. A system for anti-money laundering surveillance, comprising:

a processor;

an outlier-shooting algorithm operable on the processor to identify any unusual, inconsistent or unexpected patterns associated with an entity, wherein using the outlier-shooting algorithm to identify any unusual, inconsistent, or unexpected patterns comprises:

determining a median value for each of a peer comparison activity data associated with the entity, exception from expected historical level of activity data associated with the entity, and volume and velocity of transactions or debit/credit flow through activity data associated with the entity;

determining a datum point having a largest distance value from the medium value for each of the peer comparison of average transaction volume and structuring activity data, exception from expected historical level of activity data, and volume and velocity of transactions or debit/credit flow through activity data;

an alert generation module configured to generate an alert when any one of the largest distance values of the data points for any one of the peer comparison of average transaction volume and structuring activity data, exception from expected historical level of activity data, and volume and velocity of transactions or debit/credit flow through activity data meets or exceeds a selected threshold associated with each of the peer comparison activity data, exception from expected historical level of activity data, volume and velocity of transactions or debit/credit flow through activity data.

11. A computer program product for anti-money laundering surveillance, the computer program product comprising a non-transitory computer-readable storage medium having computer-readable code stored thereon, such that when the computer-readable code is executed by a computer processor it causes the computer to:

analyze transaction data of an entity based on a group comprising: peer comparison of transaction data, expected level of activity, and debit/credit flow through based on volume and velocity of transaction data;

use an outlier-shooting algorithm to identify any unusual, inconsistent or unexpected patterns associated with an entity, wherein using the outlier-shooting algorithm to identify any unusual, inconsistent, or unexpected patterns comprises:

determining a median value for each of a peer comparison of transaction data, expected level of activity, and debit/credit flow through based on volume and velocity of transaction data;

determining a datum point having a largest distance value from the medium value for each of the peer comparison of transaction data, expected level of activity, and debit/credit flow through based on volume and velocity of transaction data;

generate an alert when any one of the largest distance values of the data points for any one of the peer comparison of average transaction volume and structuring activity data, expected level of activity, and debit/credit flow through based on volume and velocity of transaction data meets or exceeds a selected threshold associated with each of the peer comparison of transaction data, expected level of activity, debit/credit flow through based on volume and velocity of transaction data.

12. The computer program product of claim 11, further comprising computer usable program code configured to generate a peer comparison alert in response to an outlier based on analysis of a transaction pattern compared to types of entities having like characteristics as the entity.

13. The computer program product of claim 11, further comprising computer usable program code configured to generate an expected activity alert in response to a predetermined change in historical transaction patterns.

14. The computer program product of claim 11, further comprising computer usable program code configured to generate a flow through alert in response to the debit/credit flow through exceeding a preset score.

15. A computer program product for anti-money laundering surveillance, the computer program product comprising a non-transitory computer-readable storage medium having computer-readable code stored thereon, such that when the computer-readable code is executed by a computer processor it causes the computer to:

convert raw transaction data of an entity to daily summary transaction data;

convert daily transaction data to a group including:

peer comparison of average transaction volume and structuring activity data, exception from expected historical level of activity data, and volume and velocity of transactions or debit/credit flow through activity data;

to apply an outlier-shooting algorithm to the group of activity data to identify one or more outliers and to assign a risk score, wherein applying the outlier-shooting algorithm to identify the one or more outliers in the group comprises:

determining a median value for each of the peer comparison of average transaction volume and structuring activity data, exception from expected historical level of activity data, volume and velocity of transactions or debit/credit flow through activity data;

determining a datum point having a largest distance value from the medium value for each of the peer comparison of average transaction volume and structuring activity data, exception from expected historical level of activity data, volume and velocity of transactions or debit/credit flow through activity data;

generating an alert when any one of the largest distance values of the data points for any one of the peer comparison of average transaction volume and structuring activity data, exception from expected historical level of activity data, volume and velocity of transactions or debit/credit flow through activity data meets or exceeds a selected threshold associated with each of the peer comparison of average transaction volume and structuring activity data, exception from expected historical level of activity data, volume and velocity of transactions or debit/credit flow through activity data.

16. The computer program product of claim 15, further comprising computer usable program code configured to identify any unusual, inconsistent or unexpected patterns associated with an entity.

17. The computer program product of claim 15, further comprising computer usable program code configured to identify any unusual, inconsistent or unexpected patterns associated with an entity in comparison to like patterns types of entities having like characteristics as the entity.

* * * * *